United States Patent [19]

Sakamoto

[11] Patent Number: 4,573,657
[45] Date of Patent: Mar. 4, 1986

[54] VERTICAL ADJUSTMENT DEVICE FOR A VEHICLE SEAT

[75] Inventor: Takao Sakamoto, Akishima, Japan

[73] Assignee: Tachikawa Spring Co., Ltd., Tokyo, Japan

[21] Appl. No.: 652,766

[22] Filed: Sep. 20, 1984

[51] Int. Cl.$^4$ ............................ B60N 1/02; F16F 1/16
[52] U.S. Cl. .................................... 248/575; 248/421; 248/588
[58] Field of Search ............... 248/575, 588, 421, 396, 248/576–578; 267/172

[56] References Cited

U.S. PATENT DOCUMENTS

| | | | |
|---|---|---|---|
| 2,735,669 | 2/1956 | Seiler | 267/172 |
| 2,977,109 | 3/1961 | Beckwith | 267/172 |
| 3,473,776 | 10/1969 | Costin | 248/421 |
| 3,826,457 | 7/1974 | Huot | 248/421 |
| 4,125,242 | 11/1978 | Meiller | 248/421 |
| 4,241,894 | 12/1980 | Okuyama | 248/576 |
| 4,312,491 | 1/1982 | Aondetto | 248/421 |

FOREIGN PATENT DOCUMENTS

| | | | |
|---|---|---|---|
| 2625508 | 12/1977 | Fed. Rep. of Germany | 248/575 |
| 2033531 | 5/1980 | United Kingdom | 248/575 |
| 608677 | 5/1978 | U.S.S.R. | 248/576 |

Primary Examiner—Reinaldo P. Machado
Assistant Examiner—Alvin Chin-Shue
Attorney, Agent, or Firm—Hoffmann, Dilworth, Barrese & Baron

[57] ABSTRACT

An improved vertical adjustment device for use with a seat in a vehicle such as an automobile is disclosed which is capable to adjust the cushioning function of such seat. In this vertical adjustment device, a cam with an operation lever is cooperatively connected with the sliding portions of a pair of X-shaped expansion legs by means of springs interposed between the cam and the sliding portions to energize the sliding portions in their sliding direction. The expansion legs are respectively provided between a seat support frame for carrying the seat thereon and a mounting frame to be fixed directly or indirectly to a floor of the vehicle. With this improved vertical adjustment device, the cam can be rotated to adjust the elastic forces of the springs.

4 Claims, 9 Drawing Figures

VERTICAL ADJUSTMENT DEVICE FOR A VEHICLE SEAT

BACKGROUND OF THE INVENTION

1. Field of the Invention

The present invention relates to a vertical adjustment device for use in a seat in a vehicle such as a truck, and, more particularly, to an improved vertical adjustment device which can be flexed according to the difference between the weights of occupants to adjust its own cushioning property.

2. Description of the Prior Art

A conventional vertical adjustment device of this type comprises a plurality of parallel links provided between a mounting frame to be fixed to a vehicle floor and a seat support frame on which a seat rests, a spring extended between the parallel links and the mounting frame or the seat support frame, and an adjust screw mounted to the spring, whereby the adjust screw can be rotated to adjust the elasticity of the spring. Therefore, when the flexion of the seat is to be adjusted for the occupant's weight ranging from 50 kg to 100 kg, for example, a handle provided integrally with the adjust screw must be rotated 15 times or so for proper adjustment. Also, the frames and links of the conventional adjustment device are complicated in structure, which makes it impossible to reduce the weight of the entire device to a desired level.

Also, there has been disclosed another conventional vertical adjustment device in which a mounting frame is connected with a seat support frame by means of a pair of X-shaped expansion legs and there are provided springs (compression springs) extending between the expansion legs or the seat support frame and the mounting frame. In the last-mentioned conventional device, however, as in the first-mentioned conventional one, a handle must be rotated a large number of times to adjust the elasticity of these springs.

SUMMARY OF THE INVENTION

Accordingly, it is an object of the invention to provide an improved vertical adjustment device for use in a vehicle seat which is capable to simply adjust the cushioning function of the seat only by slightly rotating an operation lever so as to cope with the difference between the weights of various occupants.

It is another object of the invention to provide an improved vertical adjustment device which is simple in structure and thus can be reduced in weight over the above-mentioned prior art adjustment devices.

The foregoing objects can be easily accomplished in accordance with the invention as follows:

That is, according to the subject matter of the invention, there is provided an improved vertical adjustment device for use in a vehicle seat, which is provided with a pair of X-shaped expansion legs located between a mounting frame and a seat support frame to be free to rotate pivotally at their respective central portions so as to adjust the vertical positions of the seat support frame carrying the seat thereon, characterzed in that a cam with an operation lever is connected with the sliding portions of said expansion legs by means of springs interposed therebetween to energize said expansion legs in their sliding direction, and that said cam can be rotated to adjust the elasticity of said springs. Namely, according to the invention, when said cam is rotated, the elasticity of said springs relative to said expansion legs can be adjusted to obtain a suitable flection of the seat for the weight of the occupant. Therefore, since the adjustments for the difference between the occupants' weights can be performed by a slight rotation of the cam, the present invention provides for faster and easier adjustment, when compared with the prior art devices. Also, as the cam may be connected with the sliding portions of the expansion legs by means of the springs, the invention is simple in structure and thus it can be reduced in weight.

It is still another object of the invention to provide an improved vertical adjustment device which can offer a seat flexion substantially proportional to the loads of the occupants and also which provides for accurate adjustments for the weight by means of rotation of the cam.

In attaining this object, according to the invention, each of said spring comprises a compression spring having a non-linear spring property so that such seat flexion is varied linearly and proportionally relative to the loads.

The above and other related objects and features of the invention will be apparent from a reading of the following description of the disclosure found in the accompanying drawings and the novelty thereof pointed out in the appended claims.

DETAILED DESCRIPTION OF A PREFERRED EMBODIMENT OF THE INVENTION

Figure 2:
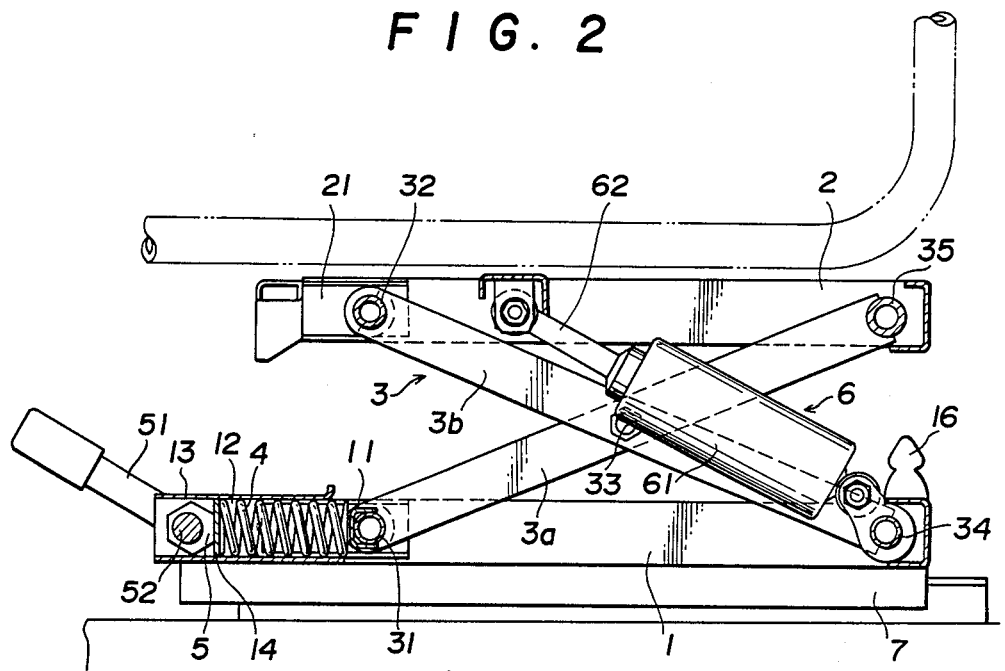
FIG. 2 is a longitudinal sectional view of the above embodiment.
Figure 1:
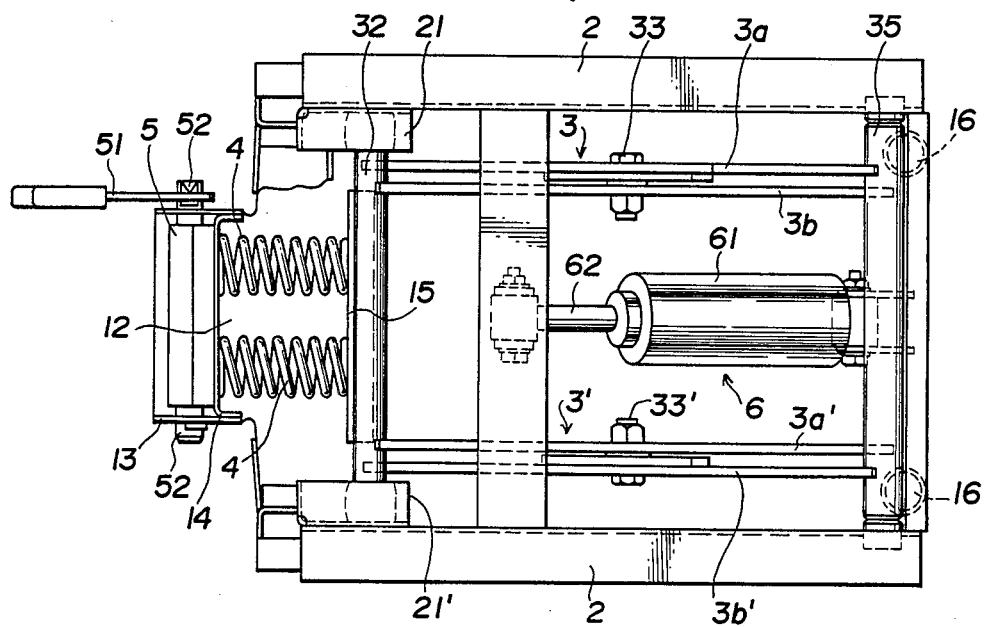
FIG. 1 is a partially cut-away plan view of an embodiment of the invention.

FIGS. 1 and 2 respectively illustrate a vertical adjustment device of the invention which is designed for use in a vehicle seat.

In the drawings, reference character (1) designates a mounting frame formed of a metal rod having a U-shaped section, (2) represents a seat support frame on which the sitting portion of a seat rests, (3) (3') respectively stand for a pair of expansion legs provided between said mounting frame (1) and said seat support frame (2), (4) (4) denote springs (compression springs) which energizes said expansion legs (3) (3') in their sliding direction, and (5) designates a cam which can be rotated by means of operation of an operation lever (51) to adjust the elasticity of said springs (4) (4). Reference character (6) represents a hydraulic adjustment device which can adjust the height of the seat support frame (2) by expanding and contracting a piston (62) within a cylinder (61).

The above-mentioned mounting frame (1), as shown, is fixed to the floor of a vehicle through a seat adjuster (7), and is formed with a fixed guide portions(11) having a U-shaped section in its right and left front sections, within which guide portions (11) are loosely fitted the sliding portions (31) of the expansion legs (3) (3') respectively in such a manner that they can be moved back and forth. The mounting frame (1) is also provided with a projection (13) in its forward-most portion and a spring storage portion (12) between the projection (13) and the sliding portions (31) of the expansion legs (3) (3'). Within the projection (13) is so mounted the cam (5) as to be free to rotate, and the springs (4) (4) are extended between such cam (5) and the sliding portions (31) of the expansion legs (3) (3'). Also, a delivery plate (14) is interposed between the springs (4) (4) and the cam (5) to transmit the elastic forces of the springs (4) (4) to the cam (5) stably. Therefore, the rotation of the cam (5) is regulated by the elastic forces of the springs (4) (4). In other words, the cam (5) can be rotated by rotating the operation lever (51) integrally fixed to the rotation shaft (52) of the cam (5) against the elastic forces of the springs (4) (4).

The seat support frame (2) is formed with U-shaped guide portions (21) (21') in its right and left forward portions which are positioned just above the guide portions (11) (11') of the mounting frame (1), within which guide portions (21) (21') are slidably mounted the second sliding portions (32) of the expanions legs (3) (3').

The right and left expansion legs (3) (3') respectively comprise two links (3a) (3b) and (3a') (3b') which are pivotally connected with each other at their central portions in an X-shaped manner by bolts (33) (33'), with their respective first end (or, the right-hand ends in the drawings) being slidably mounted to the mounting frame (1) and the seat support frame (2) through respective rotation shafts (34) (35), their respective second ends slidably mounted to the guide portions (11) (11') of the mounting frame (1) and the guide portions (21) (21') of the seat support frame (2) via the above-mentioned sliding portions (31) (32) as described before. The lower sliding portion (31) is a connecting rod to connect the links (3a) (3a') of the expansion legs (3) (3') integrally with each other, with both ends thereof being mounted within the guide portions (11) (11'), (21) (21'). A bracket (15) is fixedly mounted to the central portion of the connecting rod. With this structure, the elastic forces of the springs (4) (4) act on the sliding portion (31) of the expansion legs (3) (3') via the bracket (15). In the drawings, (16) (16) designate stoppers formed of rubber, which, as shown in FIGS. 5(D) and 5(E), are operated when a predetermined load (F kg) is applied to the seat support frame (2).

Figure 3:
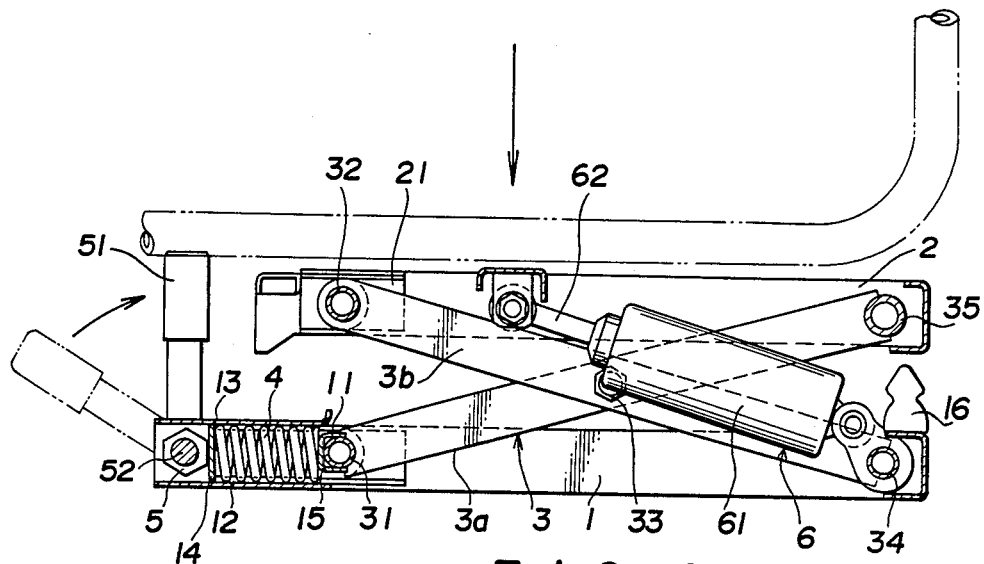
FIG. 3 is a longitudinal sectional view of the same after it is adjusted.

Referring now to FIG. 3, the operation lever (51) is grasped by hand to rotate the cam (5) against the elastic forces of the springs (4) (4) so as to adjust the elastic forces of the springs (4) (4), so that the flexion of the seat suitable for the weight of the occupant can be obtained.

Figure 4:
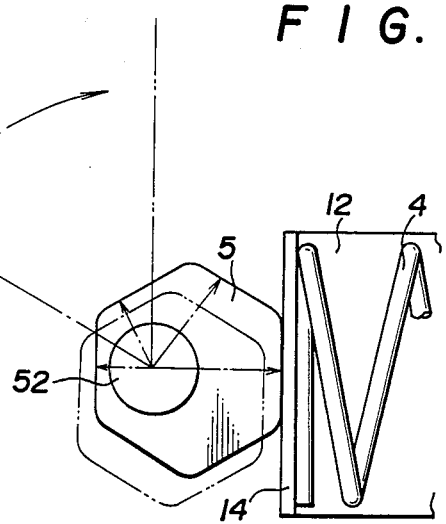
FIG. 4 is an enlarged side view of the main portions of the same.

FIG. 4 shows the joint portions of the cam (5) and the springs (4) and also illustrates that the rotation of the cam (5) pushes or pulls the springs (4) to adjust the elastic forces of the springs (4).

Figure 5A:
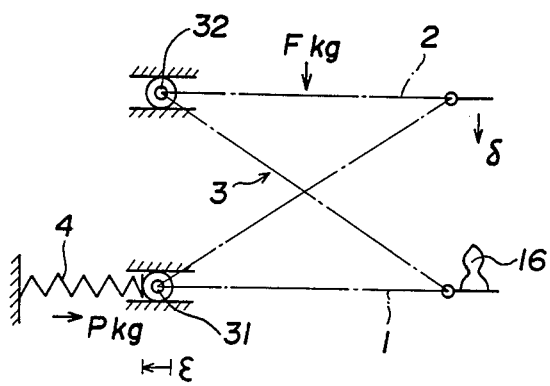
FIG. 5(A) is an explanatory view to illustrate the relationship between the elastic forces of springs and loads applied to a seat.
Figure 5B:
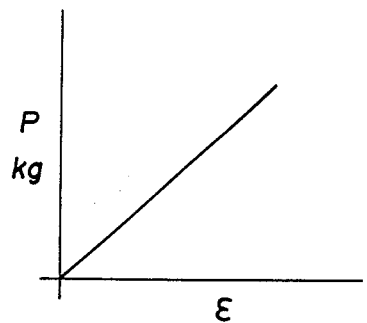
FIG. 5 (B) is a graphical representation to illustrate the relationship between loads applied to a spring and spring flexion when the spring is one having a spring characteristic of a fixed spring constant.
FIG. 5(C) is a graphical representation to illustrate the relationship between loads applied to a spring and spring flexion when the spring is one having a non-linear spring characteristic.
FIG. 5(D) is a graphical representation to illustrate the relationship between loads applied to a seat and seat flexion when the spring of FIG. 5(B) is used; and, FIG. 5(E) is a graphical representation to illustrate the relationship between loads applied to a seat and seat flexion when the spring of FIG. 5(C) is used.
Figure 5C:
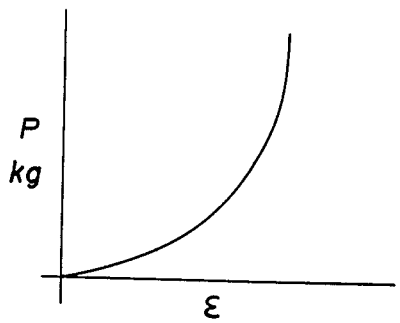
Figure 5D:
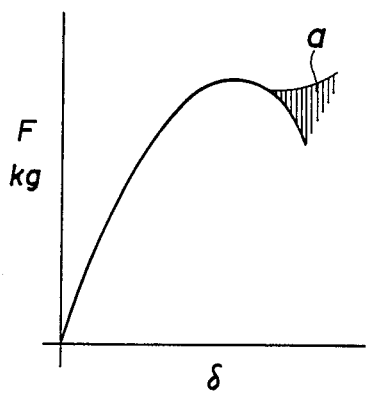
Figure 5E:
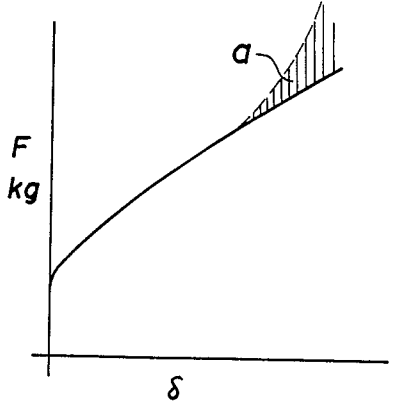

FIGS. 5(A), (B), (C), (D) and (E) show a comparison of a spring having a fixed spring constant with a non-linear spring. Specifically, FIG. 5(A) illustrates the relationship between the elastic forces of the springs (4) (4) and the loads applied to the seat. It can be understood that when the spring having a fixed spring constant as shown in FIG. 5(B) is used, the flexion ($\delta$) relative to the loads applied (F kg) is varied curvedly (FIG. 5(D)). On the other hand, when the spring having a non-linear spring characteristic as shown in FIG. 5(C) is used, as illustrated in FIG. 5(E), the flection ($\delta$) is changed linearly and porportionally relative to the loads (F). Thus, it is clear that the spring having a non-linear spring characteristic is best suited for the springs (4) (4) of the invention. To this end, rubber may be advantageously used, or, in order to obtain a spring less expensive than a double pitch spring, two linear springs different in free height may be used. Reference character ($\epsilon$) in FIGS. (A), (B) and (C) denotes the flection of the spring, while (a) in FIGS. 5(D) and (E) expresses the flexion produced by the stopper (16).

In the present invention, since, as described hereinbefore, a cam is cooperatively connected with the sliding portion of an X-shaped expansion leg via springs energizing the expansion leg in its sliding direction, a slight rotation of an operation lever can change the elastic forces of the springs relative to the expansion leg and thus it is possible to adjust the cushioning property of the seat according to the weights of occupants. Therefore, the invention can be adjusted and operated more simply and easily compared with the prior art devices employing the rotation of a screw. Also, since the invention is simple in structure and the elastic forces of the springs can be performed effectively, it can be more compact and lighter than the conventional devices. Further, with the invention, as a spring having a non-linear spring characteristic is used, a flection substantially porportional to a load applied can be obtained and thus an accurate adjustment for weight using rotation of the cam can be achieved.

What is claimed is:

1. In a vertical adjustment device for use in a vehicle seat including a pair of X-shaped expansion legs provided between a mounting frame and a seat support frame, each of said legs rotatably connected at one end thereof to sliding portions on either said mounting frame or said seat support, and adapted to be free to rotate pivotally at their respective central portions so as to adjust the vertical positions of said seat support frame carrying said seat thereon, the improvement for adjusting cushioning force imparted to said seat comprising an adjustable cam having a self-stop means and an operation lever cooperatively connected with the sliding portions of said expansion legs by means of springs interposed therebetween to energize said expansion legs in their sliding direction whereby said cam is rotated to adjust the pre-load elastic forces of said springs and adjust said cushioning force of said seat.

2. The vertical adjustment device as defined in claim 1, wherein each of said springs comprises a spring having a non-linear spring characteristic.

3. The vertical adjustment device as defined in claim 1, wherein each of said springs comprises a compression spring having a fixed spring constant.

4. The vertical adjustment device of claim 1 wherein said self-stop means comprises a multiple-faced flat surface cam whereby rotation of said cam to an adjacent surface without movement of said operation lever is prevented.

* * * * *